(12) United States Patent
Luo et al.

(10) Patent No.: US 11,720,782 B2
(45) Date of Patent: Aug. 8, 2023

(54) MULTI-SENSOR, MULTI-VIEW, MULTI-FRAME, MULTI-TASK SYNTHETIC IMAGE FUSION ENGINE FOR MOBILE IMAGING SYSTEM

(71) Applicant: Samsung Electronics Co., Ltd., Suwon-si (KR)

(72) Inventors: Chenchi Luo, Plano, TX (US); Gyeongmin Choe, Plano, TX (US); Yingmao Li, Allen, TX (US); Zeeshan Nadir, Richardson, TX (US); Hamid R. Sheikh, Allen, TX (US); John Seokjun Lee, Allen, TX (US); Youngjun Yoo, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 262 days.

(21) Appl. No.: 17/135,573

(22) Filed: Dec. 28, 2020

(65) Prior Publication Data

US 2021/0390375 A1    Dec. 16, 2021

Related U.S. Application Data

(60) Provisional application No. 63/039,249, filed on Jun. 15, 2020.

(51) Int. Cl.
*G06N 3/00*  (2023.01)
*G06N 3/045*  (2023.01)
(Continued)

(52) U.S. Cl.
CPC ............ *G06N 3/045* (2023.01); *G06N 3/042* (2023.01); *G06N 3/08* (2013.01); *G06T 7/44* (2017.01);
(Continued)

(58) Field of Classification Search
CPC ...... G06N 3/0454; G06N 3/0427; G06N 3/08; G06T 7/44; G06T 7/60;
(Continued)

(56) References Cited

U.S. PATENT DOCUMENTS 8,384,803 B2   2/2013   Iizuka
8,780,200 B2   7/2014   Yamamoto
(Continued)

FOREIGN PATENT DOCUMENTS

KR      102074072 B1    2/2020
WO     2020069460 A1    4/2020
(Continued)

OTHER PUBLICATIONS

International Search Report of the International Searching Authority in connection with International Patent Application No. PCT/KR2021/007434 dated Sep. 14, 2021, 3 pages.

*Primary Examiner* — Nancy Bitar
*Assistant Examiner* — Xiao Liu

(57) ABSTRACT

A method includes obtaining, using at least one processor of an electronic device, multiple calibration parameters associated with multiple sensors of a selected mobile device. The method also includes obtaining, using the at least one processor, an identification of multiple imaging tasks. The method further includes obtaining, using the at least one processor, multiple synthetically-generated scene images. In addition, the method includes generating, using the at least one processor, multiple training images and corresponding meta information based on the calibration parameters, the identification of the imaging tasks, and the scene images. The training images and corresponding meta information are generated concurrently, different ones of the training images (Continued)

correspond to different ones of the sensors, and different pieces of the meta information correspond to different ones of the imaging tasks.

20 Claims, 10 Drawing Sheets

(51) Int. Cl.
*G06T 7/60* (2017.01)
*G06T 7/44* (2017.01)
*G06N 3/08* (2023.01)
*G06N 3/042* (2023.01)

(52) U.S. Cl.
CPC ...... *G06T 7/60* (2013.01); *G06T 2207/10024* (2013.01); *G06T 2207/20081* (2013.01)

(58) Field of Classification Search
CPC . G06T 2207/10024; G06T 2207/20081; G06T 2207/20084; G06T 2207/20208; G06T 5/002; G06T 5/009; G06T 2207/20221; G06T 5/50; G06V 10/26; G06V 10/147; G06V 10/454; G06V 10/82
See application file for complete search history.

(56) References Cited

U.S. PATENT DOCUMENTS

| | | | |
|---|---|---|---|
| 9,253,397 B2 | 2/2016 | Lee et al. | |
| 9,591,240 B1* | 3/2017 | Barbu | H04N 23/74 |
| 10,003,785 B2 | 6/2018 | Yoon et al. | |
| 11,152,785 B1* | 10/2021 | Stahlfeld | H02J 3/0073 |
| 2019/0156485 A1 | 5/2019 | Pfeiffer | |
| 2019/0158813 A1* | 5/2019 | Rowell | H04N 13/111 |
| 2019/0164256 A1 | 5/2019 | Ouyang et al. | |
| 2019/0178988 A1 | 6/2019 | Englard et al. | |
| 2020/0342652 A1* | 10/2020 | Rowell | G06V 10/82 |

FOREIGN PATENT DOCUMENTS

| | | | |
|---|---|---|---|
| WO | 2020098953 A1 | 5/2020 | |
| WO | 2020115544 A1 | 6/2020 | |

* cited by examiner

MULTI-SENSOR, MULTI-VIEW, MULTI-FRAME, MULTI-TASK SYNTHETIC IMAGE FUSION ENGINE FOR MOBILE IMAGING SYSTEM

CROSS-REFERENCE TO RELATED APPLICATION AND PRIORITY CLAIM

This application claims priority under 35 U.S.C. § 119(e) to U.S. Provisional Patent Application No. 63/039,249 filed on Jun. 15, 2020.

TECHNICAL FIELD

This disclosure relates generally to imaging systems. More specifically, this disclosure relates to a multi-sensor, multi-view, multi-frame, multi-task synthetic image fusion engine for a mobile imaging system.

BACKGROUND

Many mobile electronic devices, such as smartphones and tablet computers, include multiple cameras, depth sensors, and even time-of-flight (ToF) sensors in a variety of physical arrangements and specifications. This type of complicated camera/depth sensor system is designed to offer better photography or computer vision tasks, such as depth-of-field rendering (like for Bokeh effects), super-resolution, high dynamic range (HDR), optical flow, semantic segmentation, scene recognition, and the like. An artificial neural network, such as a convolutional neural network (CNN), is often used in the systems to perform these tasks. Such a CNN may require training using a large number (such as dozens, hundreds, or thousands) of training images to perform at high levels of accuracy. However, it can be very difficult to capture training images synchronously using so many sensors and to have humans annotate the training images from different sensors with pixel-level accuracy.

SUMMARY

This disclosure provides a multi-sensor, multi-view, multi-frame, multi-task synthetic image fusion engine for a mobile imaging system.

In a first embodiment, a method includes obtaining, using at least one processor of an electronic device, multiple calibration parameters associated with multiple sensors of a selected mobile device. The method also includes obtaining, using the at least one processor, an identification of multiple imaging tasks. The method further includes obtaining, using the at least one processor, multiple synthetically-generated scene images. In addition, the method includes generating, using the at least one processor, multiple training images and corresponding meta information based on the calibration parameters, the identification of the imaging tasks, and the scene images. The training images and corresponding meta information are generated concurrently, different ones of the training images correspond to different ones of the sensors, and different pieces of the meta information correspond to different ones of the imaging tasks.

In a second embodiment, an electronic device includes at least one memory configured to store instructions. The electronic device also includes at least one processing device configured when executing the instructions to obtain multiple calibration parameters associated with multiple sensors of a selected mobile device. The at least one processing device is also configured when executing the instructions to obtain an identification of multiple imaging tasks. The at least one processing device is further configured when executing the instructions to obtain multiple synthetically-generated scene images. In addition, the at least one processing device is configured when executing the instructions to generate multiple training images and corresponding meta information based on the calibration parameters, the identification of the imaging tasks, and the scene images. The training images and corresponding meta information are generated concurrently, different ones of the training images correspond to different ones of the sensors, and different pieces of the meta information correspond to different ones of the imaging tasks.

In a third embodiment, a non-transitory machine-readable medium contains instructions that when executed cause at least one processor of an electronic device to obtain multiple calibration parameters associated with multiple sensors of a selected mobile device. The medium also contains instructions that when executed cause the at least one processor to obtain an identification of multiple imaging tasks. The medium further contains instructions that when executed cause the at least one processor to obtain multiple synthetically-generated scene images. In addition, the medium contains instructions that when executed cause the at least one processor to generate multiple training images and corresponding meta information based on the calibration parameters, the identification of the imaging tasks, and the scene images. The training images and corresponding meta information are generated concurrently, different ones of the training images correspond to different ones of the sensors, and different pieces of the meta information correspond to different ones of the imaging tasks.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

FIGS. 1 through 10, discussed below, and the various embodiments of this disclosure are described with reference to the accompanying drawings. However, it should be appreciated that this disclosure is not limited to these embodiments and all changes and/or equivalents or replacements thereto also belong to the scope of this disclosure.

As noted above, many mobile electronic devices, such as smartphones and tablet computers, include multiple cameras, depth sensors, and even time-of-flight (ToF) sensors in a variety of physical arrangements and specifications. This type of complicated camera/depth sensor system is designed to offer better photography or computer vision tasks, such as depth-of-field rendering (like for Bokeh effects), super-resolution, high dynamic range (HDR), optical flow, semantic segmentation, scene recognition, and the like. An artificial neural network, such as a convolutional neural network (CNN), is often used in the systems to perform these tasks. Such a CNN may require training using a large number (such as dozens, hundreds, or thousands) of training images to perform at high levels of accuracy. However, it can be very difficult to capture training images synchronously using so many sensors and to have humans annotate the training images from different sensors with pixel-level accuracy.

This disclosure provides a multi-sensor, multi-view, multi-frame, multi-task synthetic image fusion engine for a mobile imaging system. The disclosed embodiments not only simulate the physical properties of a multi-sensor system (such as camera spacing, field of view, aperture, exposure, lens distortion, and the like) but also simulate the content information in one or more scenes, such as depth mapping, optical flow mapping, semantic segmentation, scene recognition, object detection, HDR generation, Bokeh generation, super-resolution, and the like. Note, however, that the disclosed synthetic data engine is not limited to image sensors and can effectively simulate other sensor modules, such as a ToF sensor.

Using the disclosed synthetic engine, it is possible to use simulated senor outputs as inputs and simulated scene information as ground truth labels to train one or more CNNs or other machine learning architectures to achieve a variety of tasks, possibly at the same time. The training can be performed with various tasks exclusively using only synthetic images without the need of any human annotations. Moreover, a machine learning architecture trained using the disclosed embodiments can outperform those trained using real images and human annotated ground truths.

Figure 1:
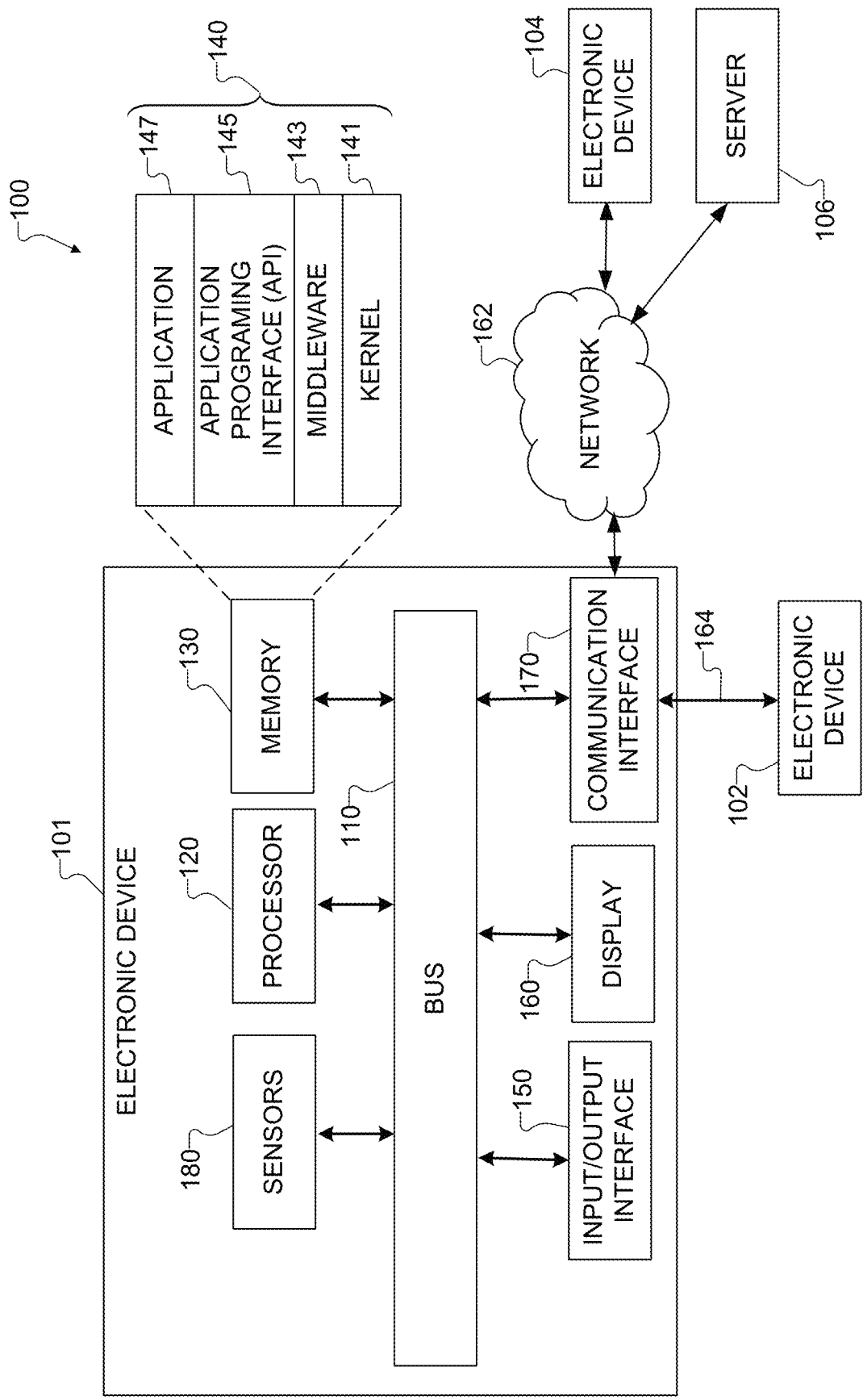
FIG. 1 illustrates an example network configuration including an electronic device according to this disclosure.

FIG. 1 illustrates an example network configuration 100 including an electronic device according to this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, or a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more of a central processing unit (CPU), an application processor (AP), or a communication processor (CP). The processor 120 is able to perform control on at least one of the other components of the electronic device 101 and/or perform an operation or data processing relating to communication. In some embodiments, the processor 120 can be a graphics processor unit (GPU). As described in more detail below, the processor 120 can obtain multiple calibration parameters associated with multiple sensors of a selected mobile device, obtain multiple imaging tasks, obtain multiple synthetically-generated scene images, and generate multiple training images and corresponding meta information based on the calibration parameters, the imaging tasks, and the scene images. The training images and corresponding meta information can be generated concurrently, different ones of the training images can correspond to different ones of the sensors, and different pieces of the meta information can correspond to different ones of the imaging tasks.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 includes one or more applications for image capture and image processing as discussed below. These functions can be performed by a single application or by multiple applications that each carry out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals, such as images.

The wireless communication is able to use at least one of, for example, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include, for example, at least one of a universal serial bus (USB), high definition multimedia interface (HDMI), recommended standard 232 (RS-232), or plain old telephone service (POTS). The network 162 or 164 includes at least one communication network, such as a computer network (like a local area network (LAN) or wide area network (WAN)), Internet, or a telephone network.

The electronic device 101 further includes one or more sensors 180 that can meter a physical quantity or detect an activation state of the electronic device 101 and convert metered or detected information into an electrical signal. For example, one or more sensors 180 can include one or more cameras or other imaging sensors for capturing images of scenes. The sensor(s) 180 can also include one or more buttons for touch input, a gesture sensor, a gyroscope or gyro sensor, an air pressure sensor, a magnetic sensor or magnetometer, an acceleration sensor or accelerometer, a grip sensor, a proximity sensor, a color sensor (such as a red green blue (RGB) sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

The first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more cameras.

The first and second external electronic devices 102 and 104 and the server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162 or 164, the electronic device 101 may be independently operated without a separate communication function according to some embodiments of this disclosure.

The server 106 can include the same or similar components 110-180 as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. In some embodiments, the server 106 can obtain multiple calibration parameters associated with multiple sensors of a selected mobile device, obtain multiple imaging tasks, obtain multiple synthetically-generated scene images, and generate multiple training images and corresponding meta information based on the calibration parameters, the imaging tasks, and the scene images. The training images and corresponding meta information can be generated concurrently, different ones of the training images can correspond to different ones of the sensors, and different pieces of the meta information can correspond to different ones of the imaging tasks.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
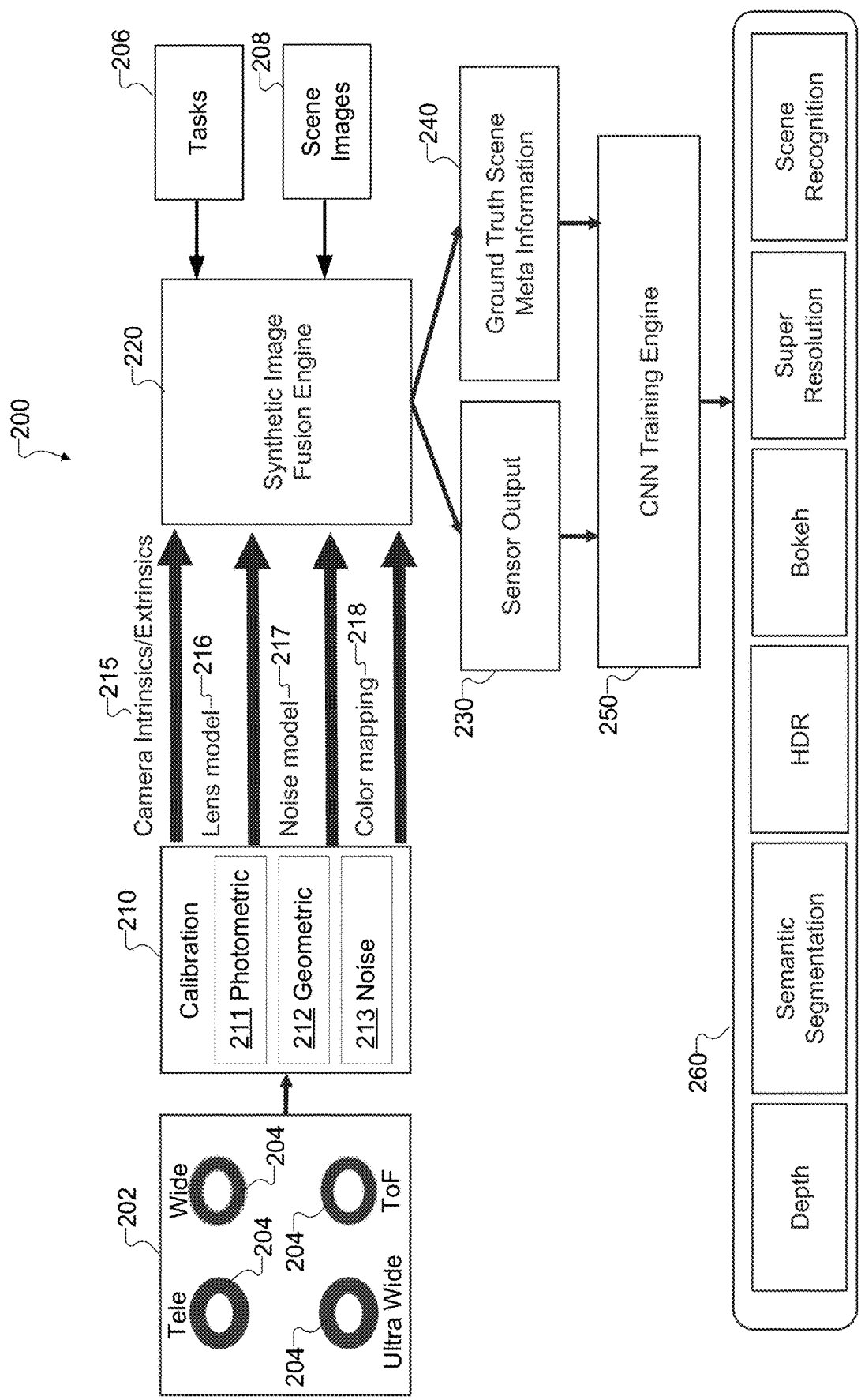
FIG. 2 illustrates an example workflow using a synthetic image fusion engine according to this disclosure.

FIG. 2 illustrates an example workflow 200 using a synthetic image fusion engine according to this disclosure. For ease of explanation, portions of the workflow 200 are described as being implemented in the electronic device 101 shown in FIG. 1. However, the workflow 200 could be implemented in any other suitable electronic device and in any suitable system, such as by the server 106. As described below, the workflow 200 uses a synthetic image fusion engine 220 to generate training image data that can be used to train one or more CNNs or other machine learning architectures.

As shown in FIG. 2, a mobile device 202, such as a smart phone, tablet, or the like, is selected. For example, an operator (such as an engineer working at the mobile device manufacturer) can select the mobile device 202 based on its make and model. The actor may select the mobile device 202 in order to generate training data for use in training one or more CNNs or other machine learning architectures associated with the mobile device 202. In some embodiments, the mobile device 202 can represent (or be represented by) one of the electronic devices 101, 102, 104 of FIG. 1.

According to its make and model, the mobile device 202 includes multiple sensors 204 arranged in a particular layout and configured for the capture of images and other information. Each of the sensors 204 can be configured for a different image capture function or other function. For example, the sensors 204 of the mobile device 202 can include a telephoto camera, a wide lens camera, an ultra-wide lens camera, and a ToF sensor arranged in a square layout. Of course, this is merely one example, and the mobile device 202 could have different numbers of sensors 204 in different arrangements or layouts (such as straight line, triangle, and the like) in other embodiments. The make, model, and sensor layout of the mobile device 202 are provided as inputs to the synthetic image fusion engine 220.

A list of imaging tasks 206 is selected for the mobile device 202, and the list is provided as an input to the synthetic image fusion engine 220. For example, the operator can select the imaging tasks 206 as training tasks that are to be performed in conjunction with the mobile device 202 and for which training data is to be generated. In some embodiments, the imaging tasks 206 can include depth, optical flow, semantic segmentation, HDR generation, Bokeh generation, super resolution, scene recognition, or a combination of two or more of these. Depending on the model of the mobile device 202 and the desired training, the selected imaging tasks 206 could include one task, more than one task, or all possible tasks. Unlike some existing processes that allow for the creation of training data for only task at a time, the synthetic image fusion engine 220 is able to concurrently generate training data for multiple imaging tasks 206 in such a manner so that the training data is synchronized across the imaging tasks 206.

Multiple scene images 208 are selected for use in the training. For example, the operator may select a variety of different scene images from a public scene image dataset, such as the MICROSOFT COCO dataset. In some embodiments, the scene images 208 include synthetically generated "perfect" images that are noise-free and have the same synthetic color. The scene images 208 can include one or more ground truth depth images. The scene images 208 are typically selected to represent a variety of different scenes, such as human portraits, indoor scenes, low light scenes, outdoor scenes, bright light scenes, action scenes, and the like. In general, a greater number of selected scene images 208 enables a greater diversity of data for training. In some typical cases, the number of scene images 208 selected could be greater than one hundred, although different numbers of selected scene images 208 are possible and within the scope of this disclosure. The scene images 208 are provided as inputs to the synthetic image fusion engine 220.

The sensors 204 of the mobile device 202 are calibrated using a calibration process 210. The calibration process 210 includes multiple calibration operations, including photometric calibration 211, geometric calibration 212, and noise calibration 213. As described in greater detail below, the calibration process 210 is performed to obtain key calibration parameters for each sensor 204, including the sensor's intrinsic and extrinsic parameters 215, lens model parameters 216 (such as lens distortion coefficients), noise model parameters 217 (such as sensor noise distribution parameters), and color mapping parameters 218 (such as one or more color mapping tables). The intrinsic parameters of a sensor are associated with internal parameters between the sensor receiver and the lens (such as optical center, focal length, etc.), while the extrinsic parameters of the sensor are associated with external parameters outside of the lens (such as location of the sensor in the scene). The calibration parameters 215-218 are provided as inputs to the synthetic image fusion engine 220 and used to reduce the differences between the synthetic scene images 208 and corresponding real images that can be captured by the mobile device 202.

Photometric calibration 211 is performed to ensure that color generation is consistent between synthetically-generated training images and real images generated by any of the sensors 204 of the mobile device 202. It is common for synthetically-generated images and actual images captured by a real camera or other sensor to have different color characteristics. In one example embodiment of the photometric calibration 211, one or more color charts can be used to generate at least one lookup table to map synthetic colors to or from actual colors under different lighting conditions. Here, the "real" colors are colors captured by the mobile device 202 using one or more of the sensors 204.

Figure 3:
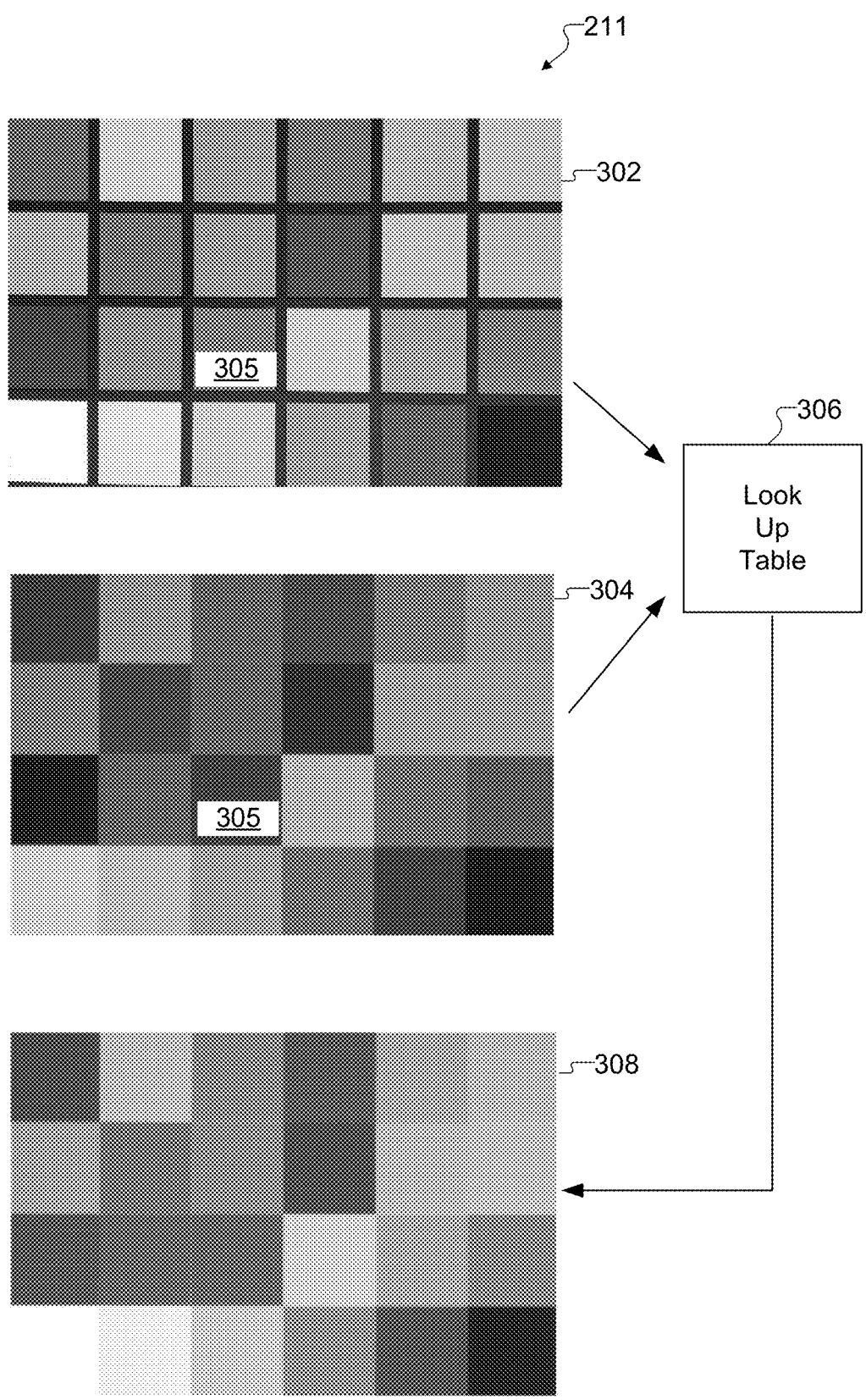
FIG. 3 illustrates additional details of an example photometric calibration according to this disclosure.

FIG. 3 illustrates additional details of an example photometric calibration 211 according to this disclosure. As shown in FIG. 3, a color chart 302 represents a real image of a color checkerboard generated by the mobile device 202 under predetermined lighting conditions and lens settings (such as ISO-50, f/2.4, 1/2000s, 9000 lux). Another color chart 304 represents a synthetically-generated image of the same color checkerboard for the same lighting conditions and lens settings. The color chart 304 represents a "perfect" representation, or ground truth, of the colors in the color chart 304. For example, one color box 305 on the color chart 304 may be perfect red, which can be represented in RGB format as (255, 0, 0). However, the same color box 305 on the color chart 302 may appear as slightly off-red (such as RGB=(254, 1, 1)). The differences between the color chart 302 and the color chart 304 can result from a variety of physical characteristics of the color checkerboard (such as material, texture, etc.), environmental factors (lighting, distance, etc.), and sensor properties (noise, focal length, etc.). In some embodiments, a lux sensor or other color measuring device can be employed to measure the differences between color chart 302 and the color chart 304.

Using the difference information, a color lookup table 306 can be generated to map colors under different lighting conditions and lens settings. For example, based on the example above, the value (255, 0, 0) can be mapped to the value (254, 1, 1) in the lookup table 306 for one of the sensors 204 for a given set of conditions. The lookup table 306 can then be provided to the synthetic image fusion engine 220 as the color mapping parameters 218 and used by the synthetic image fusion engine 220 to apply a variance to the synthetically-generated scene images 208. For example, the color chart 308 may represent a calibrated synthetic color image generated by the synthetic image fusion engine 220. While the calibrated color chart 308 is not exactly the same as the real color chart 302, the calibrated color chart 308 is closer to the real color chart 302 than the synthetic color chart 304.

Turning again to FIG. 2, the geometric calibration 212 is performed to model lens distortions exhibited by one or more of the sensors 204 of the mobile device 202. That is, the geometric calibration 212 is performed to make the synthetic scene images 208 appear more similar to images that could be captured by one or more of the real sensors 204. For example, the ultra-wide lens sensor 204 may be similar to a "fish eye" lens, generating substantial distortions at the edges of captured images. Thus, the geometric calibration 212 can be performed to emulate these distortions. Without geometric calibration 212, depth distortion may be found in peripheral regions of the synthetic training data.

Figure 4:
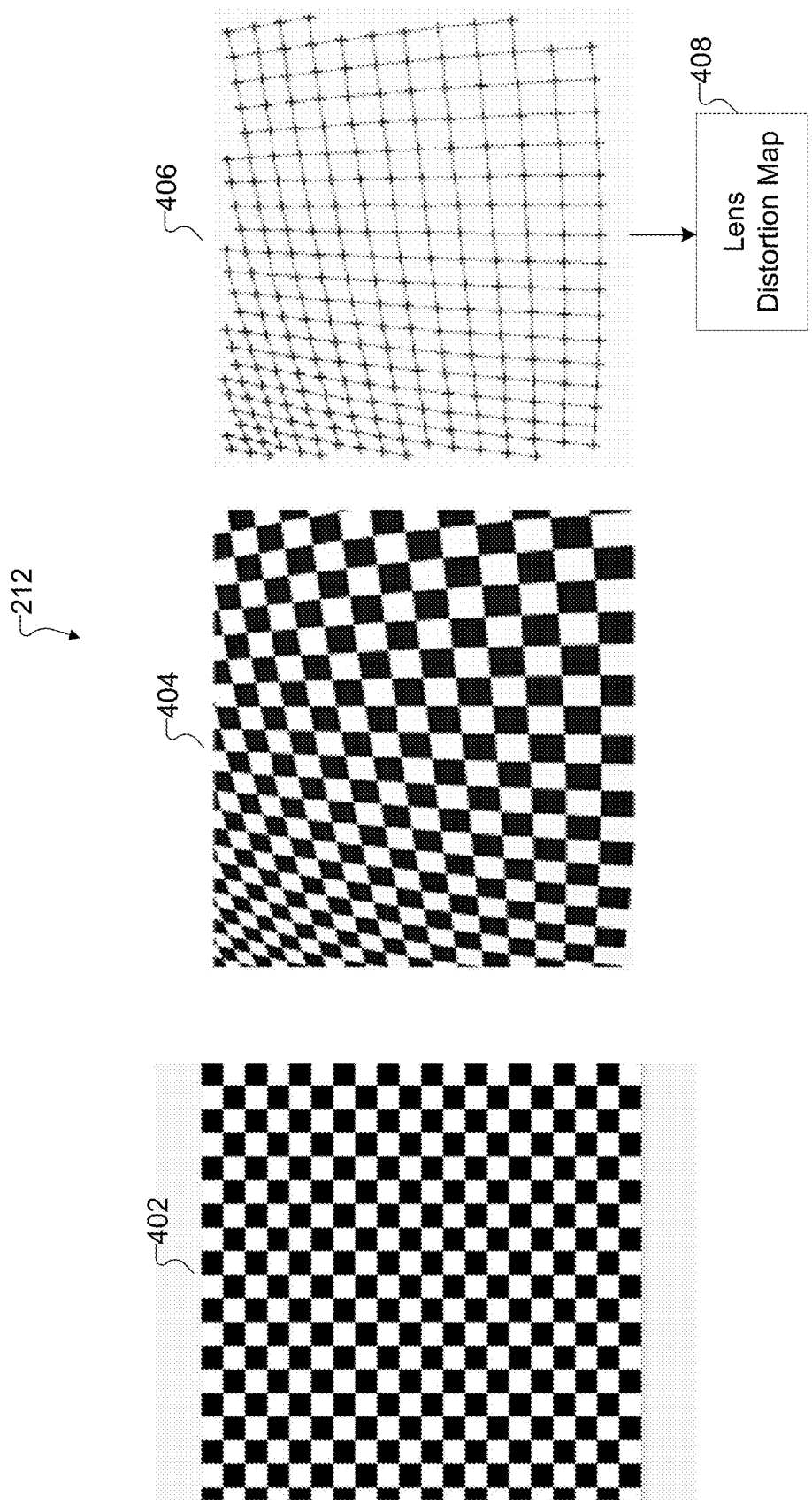
FIG. 4 illustrates additional details of an example geometric calibration according to this disclosure.

FIG. 4 illustrates additional details of an example geometric calibration 212 according to this disclosure. As shown in FIG. 4, the geometric calibration 212 can include a synthetic checkerboard image 402, a real checkerboard image 404, a mapping grid 406, and a lens distortion map 408. The synthetic checkerboard image 402 is a "perfect" or ground truth image of a physical checkerboard formed of substantially perfect squares. The synthetic checkerboard image 402 represents an image captured by an ideal sensor. The real checkerboard image 404 represents an image of the checkerboard captured by one or more sensors 204 of the mobile device 202. Because different sensors 204 are positioned in different locations on the mobile device 202, each sensor 204 captures the same image from a slightly different angle. This difference in angle can cause what is referred to as tangential distortion. As evident in FIG. 4, the real checkerboard image 404 exhibits significant distortion, while the synthetic checkerboard image 402 exhibits little or no distortion. The amount of distortion shown in the real checkerboard image 404 may be exaggerated for illustrative purposes, but the real checkerboard image 404 still represents a type of distortion that may be present in a real image.

The coordinates of each "square" of the real checkerboard image 404 can be measured and mapped into a mapping grid 406 and a lens distortion map 408 that includes multiple lens distortion coefficients. The mapping grid 406 and lens distortion map 408 represent the distortion present in the real checkerboard image 404. The mapping grid 406 shown in FIG. 4 is a visual representation of the lens distortion map 408, which can be provided to the synthetic image fusion engine 220 as the lens model parameters 216. The lens distortion coefficients of the lens distortion map 408 allow the synthetic image fusion engine 220 to "warp" the perfectly flat synthetic scene images 208 to better simulate what is actually captured by the imperfect sensors 204.

Turning again to FIG. 2, the noise calibration 213 is performed to model the amount of noise generated by the sensors 204 under different lighting conditions. For example, some synthetic data engines generate data that is too "perfect," meaning the synthetic images exhibit essentially zero noise. However, real image sensors, such as the sensors 204, may generate images with detectable or even substantial amounts of noise, especially in low light conditions. The noise calibration 213 is performed to include this noise into the generated training data.

Figure 5:
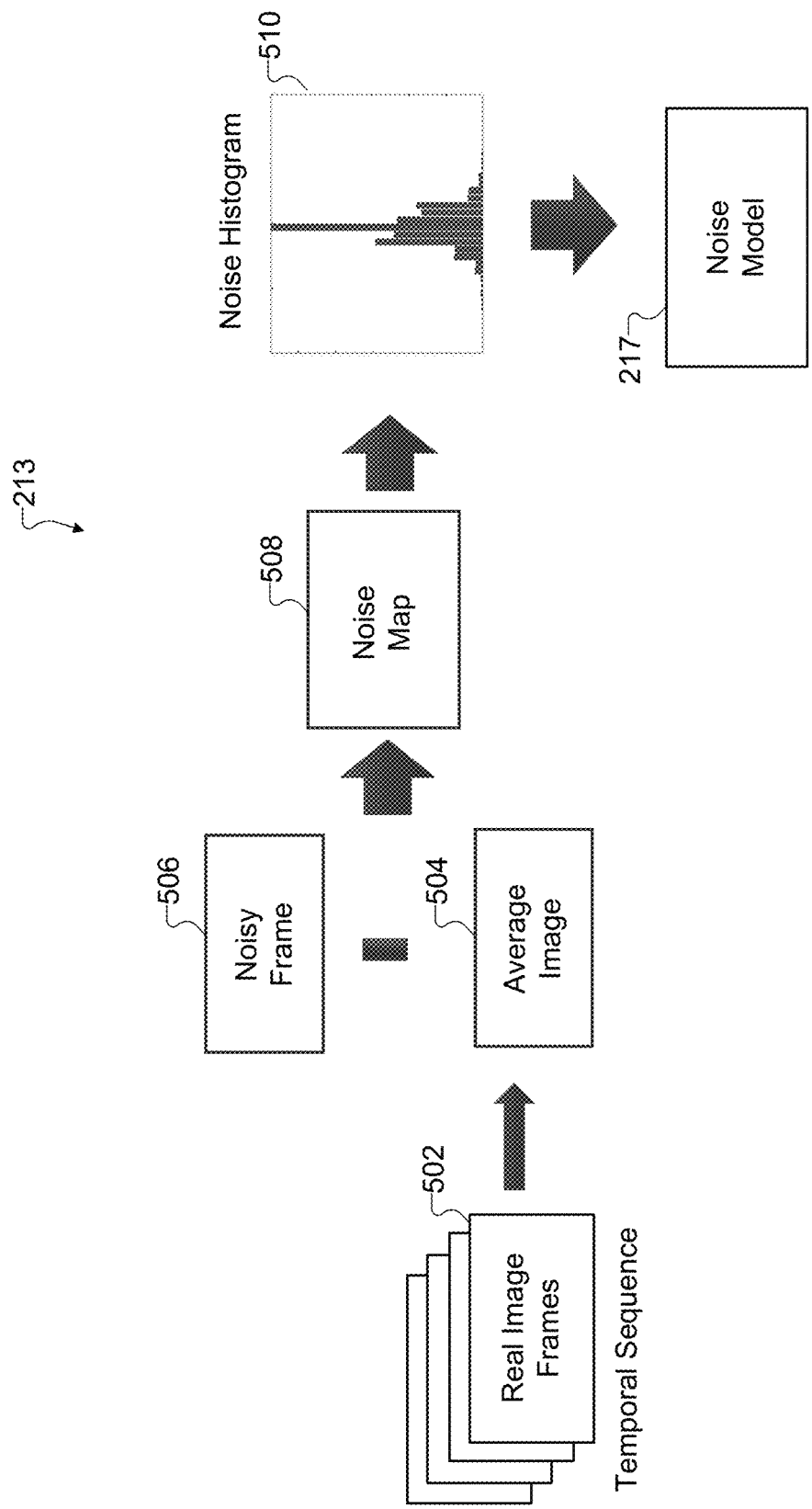
FIG. 5 illustrates additional details of an example noise calibration according to this disclosure.

FIG. 5 illustrates additional details of an example noise calibration 213 according to this disclosure. As shown in FIG. 5, multiple real image frames 502 are captured in a temporal sequence using the mobile device 202. The real image frames 502 are captured using the same sensor 204 or group of sensors 204. The real image frames 502 are typically of a static scene, such as a color chart, although other scenes are possible. While FIG. 5 shows a sequence of four real image frames 502, other numbers of real image frames 502 are possible and within the scope of this disclosure. The real image frames 502 are averaged together to generate an average image 504. The averaging of the frames 502 effectively reduces noise by averaging the noise values over multiple images. That is, the averaging has the effect of noise filtering since the noise is generally distributed randomly within images and not at the same locations in multiple images. The generated average image 504 is considered to be a noise-free ground truth of the image.

One of the real image frames 502 is selected as a noisy frame 506, and the average image 504 is subtracted from the noisy frame 506 using a pixel-wise subtraction process to generate a noise map 508. The noise map 508 is a pixel-wise representation of the noise in the noisy frame 506. Additional noise maps 508 are generated by selecting other ones of the real image frames 502 as noisy frames 506 and subtracting the average image 504 from those noisy frames 506. In some embodiments, one noise map 508 is generated for each of the real image frames 502 that are captured. Using the noise maps 508 as input, a noise histogram 510 of the noise maps 508 is generated. In some embodiments, a noise histogram 510 is generated for each of the RGB channels. The noise histogram(s) 510 can be provided as the noise model parameters 217 and used as the modeled noise that is added to the perfect synthetic scene images 208 in the synthetic image fusion engine 220.

Figure 6B:
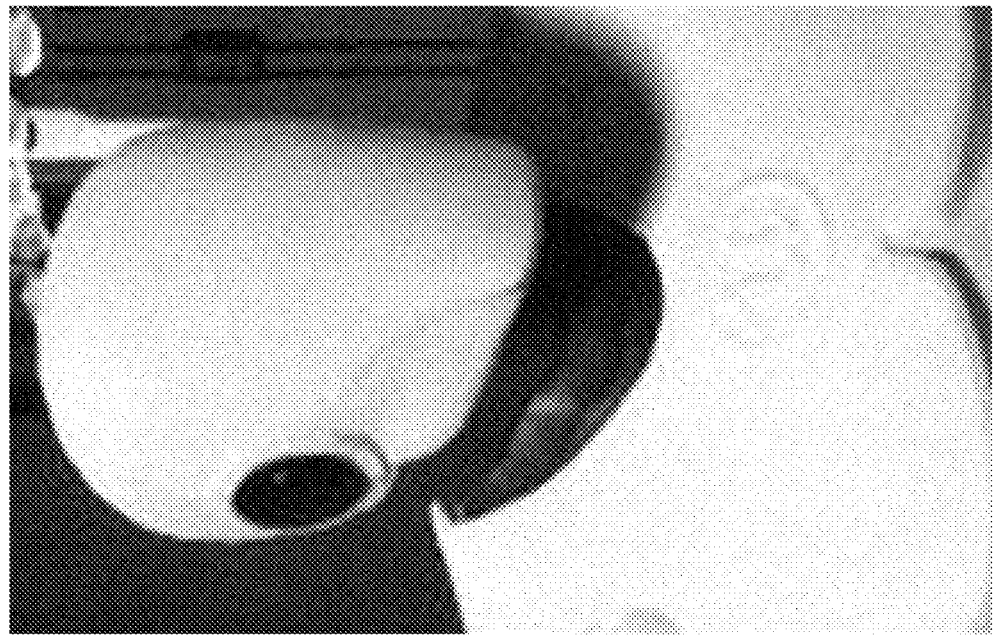
FIGS. 6A and 6B illustrate example training images generated to include different levels of noise according to this disclosure.
Figure 6A:

In some embodiments, the noise calibration 213 can be performed multiple times, such as once for each of multiple lighting conditions. Each noise calibration 213 can result in a set of noise model parameters 217 for the given light condition. The different noise model parameters 217 can be used by the synthetic image fusion engine 220 to generate training images with different amounts of simulated noise for different lighting conditions. For example, FIG. 6A shows an example training image 601 that includes noise for ISO 200 lighting, while FIG. 6B shows an example training image 602 that includes noise for ISO 800 lighting. As evident in the figures, the training image 602 includes more simulated noise than the training image 601. In both images 601 and 602, the noise is very realistic.

After the calibration process 210, the calibration parameters 215-218 can be provided as inputs to the synthetic image fusion engine 220, which concurrently generates sensor outputs 230 (including multiple synchronous sensor frames) and corresponding ground truth scene meta information 240 (such as depth map, optical flow map, semantic segmentation map, and the like) based on the scene images 208. The synthetic image fusion engine 220 can simulate a large number of synchronous sensor frames 230 and the corresponding ground truth scene meta information 240 for each imaging task 206. In addition, the synthetic image fusion engine 220 can generate the sensor frames 230 to emulate different levels of sensor noise, lens distortions, and the like, to reflect the different types and locations of the sensors 204. This helps to ensure photo-realism of the generated images.

Figure 7:
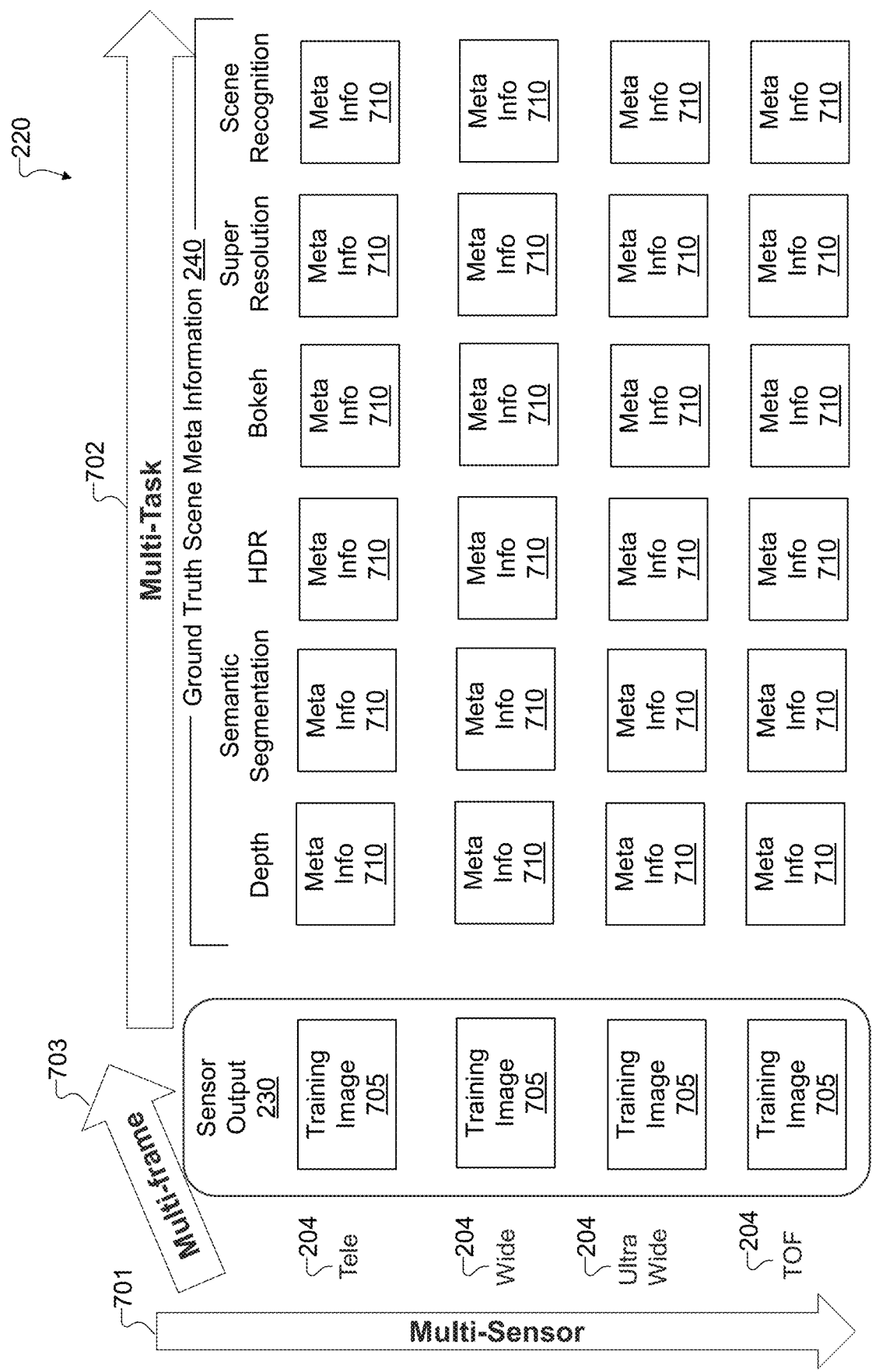
FIG. 7 illustrates example sensor outputs and ground truth scene meta information generated by the synthetic image fusion engine of FIG. 2 according to this disclosure.

FIG. 7 illustrates example sensor outputs 230 and ground truth scene meta information 240 generated by the synthetic image fusion engine 220 according to this disclosure. As shown in FIG. 7, the synthetic image fusion engine 220 generates outputs that can be arranged in three dimensions 701-703. One dimension is a "spatial" or "sensor" dimension 701, which simulates the spatial location of the different sensors 204 of the mobile device 202. Each of the sensors 204 has a different field of view based on its location on the mobile device 202 and the type of sensor, and the synthetic image fusion engine 220 generates a different training image 705 for each of the sensors 204. The training images 705 represent the simulated camera captures and are the sensor outputs 230 that are provided as inputs to a CNN training engine 250 as shown in FIG. 2.

Another dimension is the "task" dimension 702, which simulates multiple vision or imaging tasks (such as depth, semantic segmentation, HDR generation, Bokeh generation, super resolution, scene recognition, and the like) that are to be performed by the CNN training engine 250. The synthetic image fusion engine 220 generates different pieces of meta information 710 for each task and each sensor 204. The meta information 710 in each row of FIG. 7 corresponds to the training image 705 and the sensor 204 of the same row. The meta information 710 is the ground truth scene meta information 240 that is provided as input to the CNN training engine 250 and is used as the ground truth for each task-specific CNN. The various training images 705 and corresponding meta information 710 exhibit different levels of color mapping, distortion, and noise, which is an accurate reflection of image data that could be captured by the different sensors 204 of the mobile device 202.

The remaining dimension is a "temporal" or "multi-frame" dimension 703, which is represented in FIG. 7 as the Z axis (such as orthogonal to the plane of the figure). The multi-frame dimension 703 is a time axis and represents a sequence of consecutive image frames captured by the sensors 204, which can be simulated by the synthetic image fusion engine 220. That is, the synthetic image fusion engine 220 can generate additional layers of training images 705 and meta information 710, where each layer corresponds to simulated image frames that appear to be captured by the sensors 204 at a different moment in time. The training images 705 and meta information 710 in each layer can exhibit different levels of color mapping, distortion, and noise, as compared to corresponding training images 705 and meta information 710 in other layers. This reflects the fact that a scene can change over time due to object movement, camera movement, lighting changes, sensor configuration changes, and the like.

The synthetic image fusion engine 220 uses the calibration parameters 215-218 of the different sensors 204, obtained using the calibration process 210, and renders the training images 705 and corresponding meta information 710 differently for each sensor 204. The calibration process 210 enables the synthetic image fusion engine 220 to generate highly-customized data that is tuned for the specific configuration of the mobile device 202. In particular, the synthetic image fusion engine 220 ensures that the sensor outputs 230 and the ground truth scene meta information 240 are highly optimized (and thus photo-realistic) for a specific camera or phone model. The synthetic sensor outputs 230 generated by the synthetic image fusion engine 220 can precisely simulate multi-camera and multi-frame use cases. In addition, the ground truth scene meta information 240 is pixel-level accurate, which is typically not possible for human annotated systems. Also, the sensor outputs 230 and the ground truth scene meta information 240 are perfectly synchronized, or synchronized at a level of precision that is difficult or impossible in human annotated systems.

Turning again to FIG. 2, the generated sensor outputs 230 and ground truth scene meta information 240 are provided to the CNN training engine 250 to train various CNNs 260 for different tasks (such as depth, semantic segmentation, HDR generation, Bokeh generation, super resolution, scene recognition, and the like). In some embodiments, the CNNs 260 are multi-task CNNs that are difficult or impossible to accurately train without extensive manual labeling or annotation efforts. Due to the training data generated by the synthetic image fusion engine 220, the CNNs 260 trained by the CNN training engine 250 are highly optimized to the model of the mobile device 202 and surpass conventional CNNs that are trained using real images with human annotations. In addition, convergences in the CNNs 260 occur much faster than conventional CNNs because of the perfect quality of the ground truths generated by the synthetic image fusion engine 220. The synthetic image fusion engine 220 allows replacement of real image CNN training with synthetic image CNN training yet achieves better accuracy and quality for multiple tasks.

Note that while the workflow 200 has been described above as being performed at a mobile device manufacturer, the workflow 200 is not limited to offline data generation for offline CNN training. In some embodiments, at least portions of the workflow 200 can also be implemented on-device by the mobile device 202 for online data generation and online CNN fine tuning. For example, one limitation of factory-based camera or sensor calibration processes is that such processes may not capture a lens distortion map 408 due to variations in the manufacturing process of the sensors, variations in the installation processes of the sensors into the mobile devices, or a combination of these. As a result, offline implementations of the workflow 200 may only capture statistically averaged calibration parameters. This is adequate for a specific phone model in a statistical sense, but it may not fit perfectly for each individual manufactured device of the same model. In such cases, all or portions of the workflow 200 can be performed online at the mobile device 202 using a version of the synthetic image fusion engine 220 installed on the mobile device 202. For instance, after performing geometric calibration 212 using the mobile device 202, a detailed lens distortion map 408 can be generated for the specific instance of the mobile device 202. Also, an on-device version of the synthetic image fusion engine 220 can be executed using the lens distortion map 408, and the synthetic image fusion engine 220 can generate synthetic data to fine tune the CNNs on-device to achieve the best effect for the specific individual mobile device 202 (not just the device model). In some embodiments, portions of the workflow 200 (such as the synthetic image fusion engine 220) can run automatically in the background. As the mobile device 202 captures more images over time, more input data is available for the synthetic image fusion engine 220 to process.

It should be noted that at least some of the operations and functions shown in FIGS. 2 through 7 can be implemented in an electronic device 101, 102, 104, server 106, or other device(s) in any suitable manner. For example, in some embodiments, at least some of the operations shown in FIGS. 2 through 7 can be implemented or supported using one or more software applications or other software instructions that are executed by the processor 120. In other embodiments, at least some of the operations shown in FIGS. 2 through 7 can be implemented or supported using dedicated hardware components. In general, at least some of the operations shown in FIGS. 2 through 7 can be performed using any suitable hardware or any suitable combination of hardware and software/firmware instructions.

Although FIGS. 2 through 7 illustrate example details of a workflow 200 using a synthetic image fusion engine, various changes may be made to FIGS. 2 through 7. For example, while shown as a specific sequence of operations, various operations shown in FIGS. 2 through 7 could overlap, occur in parallel, occur in a different order, or occur any number of times (including zero times). Also, the specific operations shown in FIGS. 2 through 7 are examples only, and other techniques could be used to perform each of the operations shown in FIGS. 2 through 7. In addition, while described as being used to train CNNs, the same or similar approaches here may be used to train any other suitable machine learning architectures.

Figure 8A:
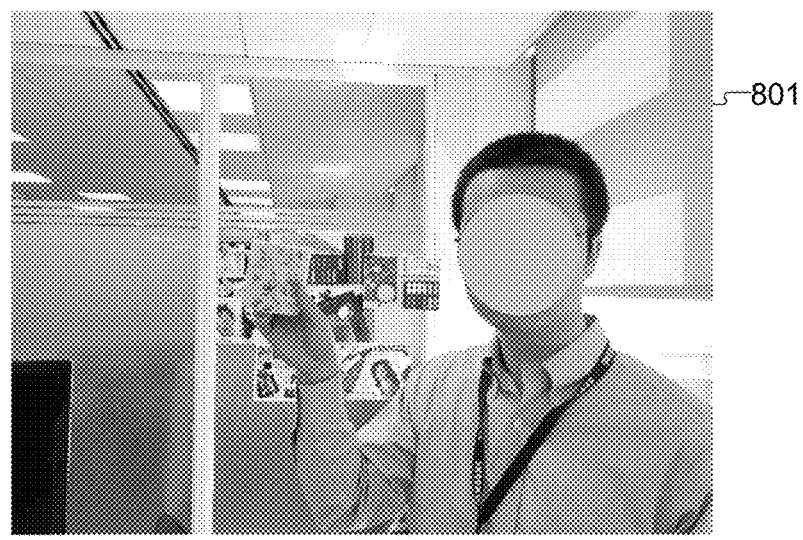
FIGS. 8A, 8B, and 8C illustrate example benefits that can be realized using one or more of the embodiments of this disclosure.
Figure 8B:
Figure 8C:

FIGS. 8A, 8B, and 8C illustrate example benefits that can be realized using one or more of the embodiments of this disclosure. More specifically, FIG. 8A illustrates a real image 801, while FIGS. 8B and 8C illustrate depth maps 802 and 803 that are generated using the real image 801. In the image 801, the subject's face is obscured for privacy. In FIG. 8B, the depth map 802 was generated using a conventional depth map training operation. As evident by FIG. 8B, the depth map 802 exhibits significant blurring at transitions between dark and light areas. In contrast, the depth map 803 in FIG. 8C was generated using the synthetic image fusion engine 220 as described above. The resulting depth map 803 exhibits much sharper transitions between dark and light areas. In addition, the results can be better customized to a particular imaging system. The synthetic image fusion engine 220 provides more details and more accurate depth estimation.

Figure 9A:
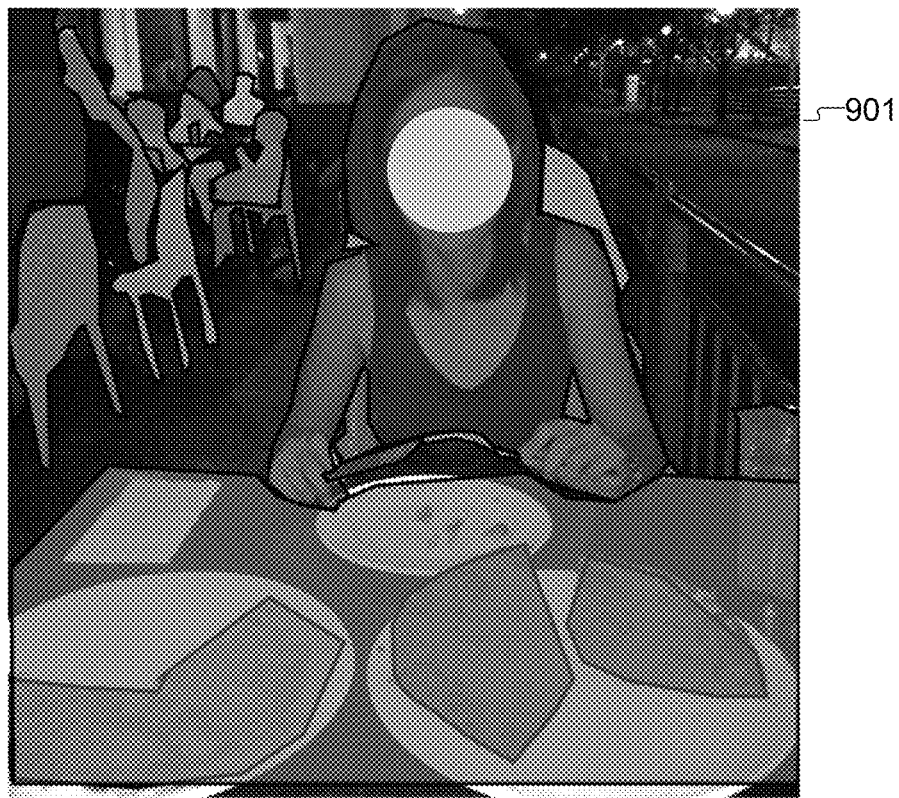
FIGS. 9A and 9B illustrate additional example benefits that can be realized using one or more of the embodiments of this disclosure.
Figure 9B:
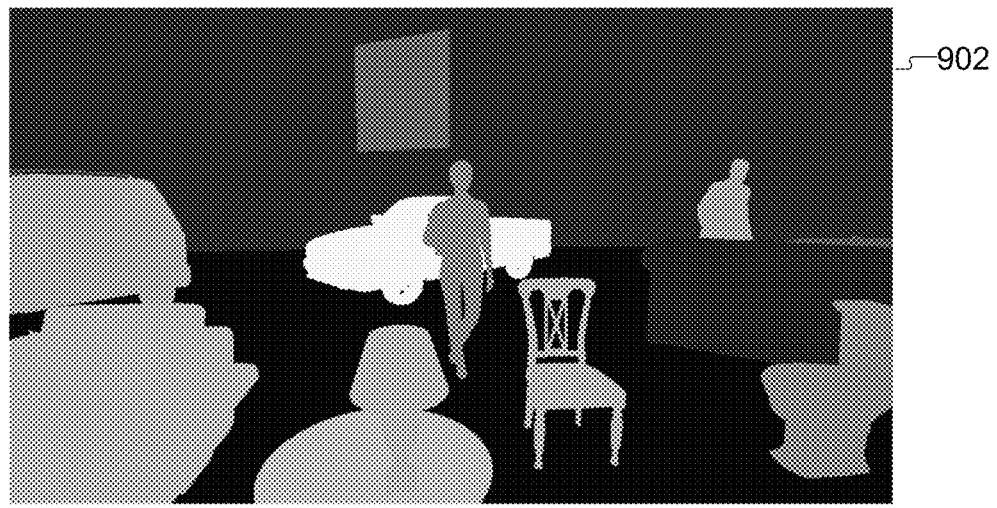

FIGS. 9A and 9B illustrate additional example benefits that can be realized using one or more of the embodiments of this disclosure. More specifically, FIGS. 9A and 9B illustrate a comparison between semantic segmentation using conventional techniques and semantic segmentation using one or more of the embodiments of this disclosure. In FIG. 9A, an image 901 is a publicly-available annotated ground truth from a public dataset. The level of accuracy of the image 901 is polygon level accuracy, not pixel-level accuracy. That is, the shapes outlined in the image 901 include polygons of limited detail, which is a limitation of human annotation. In contrast, FIG. 9B shows a ground truth image 902 that was generated using the synthetic image fusion engine 220 as described above. The ground truth image 902 exhibits pixel-level accuracy and precision, meaning a much finer level of accuracy and precision, compared to the image 901.

Although FIGS. 8A, 8B, 8C, 9A, and 9B illustrate examples of benefits that can be realized using one or more of the embodiments of this disclosure, various changes may be made to these figures. For example, images can be captured of numerous scenes under different conditions and with different sensors, and these figures do not limit the scope of this disclosure. These figures are merely meant to illustrate example types of benefits that might be obtainable using the techniques described above.

Figure 10:
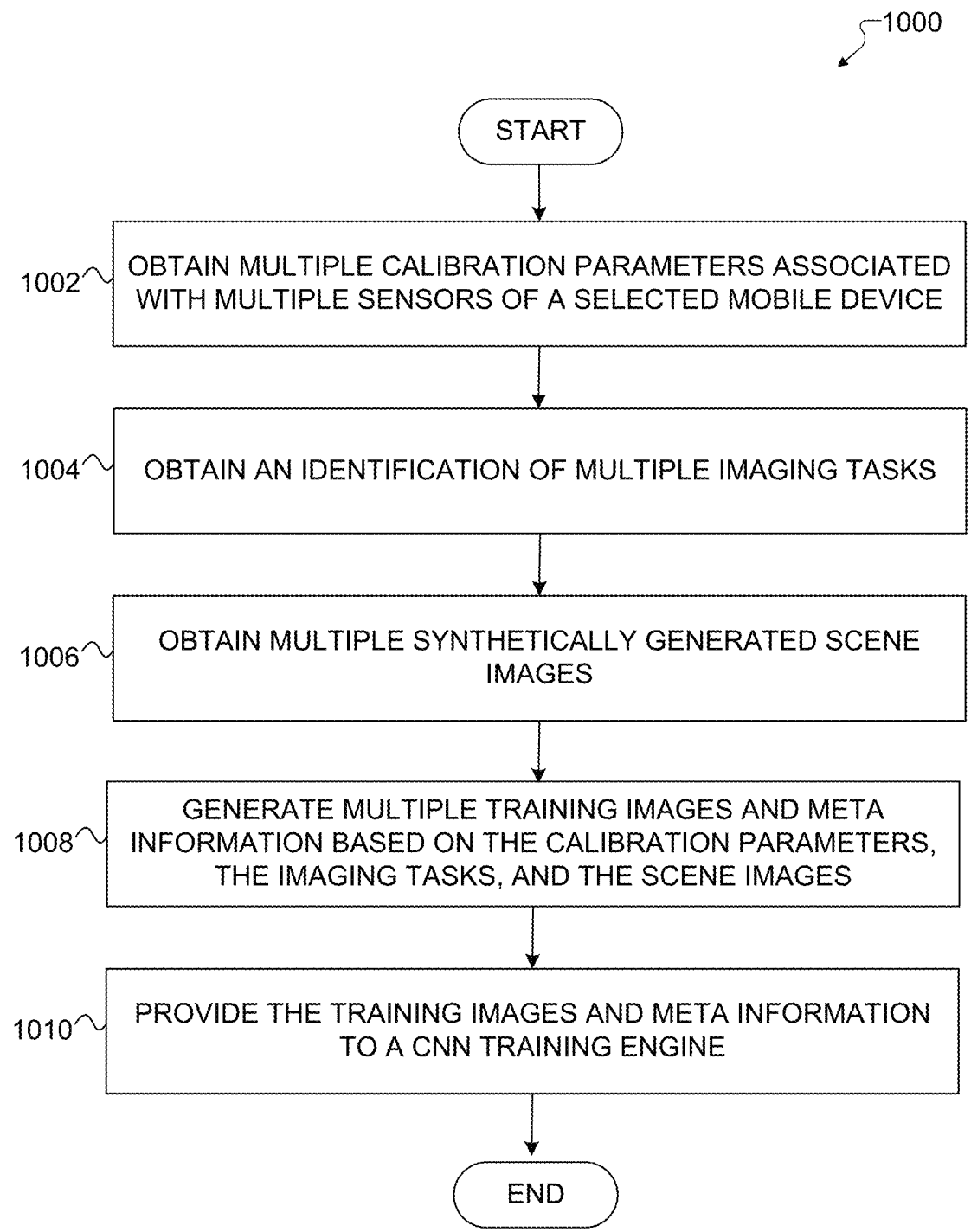
FIG. 10 illustrates an example method for generating training data using a synthetic image fusion engine according to this disclosure.

FIG. 10 illustrates an example method 1000 for generating training data using a synthetic image fusion engine according to this disclosure. For ease of explanation, the method 1000 shown in FIG. 10 is described as involving the use of the workflow 200 shown in FIGS. 2 through 7 with the electronic device 101 shown in FIG. 1. However, the method 1000 shown in FIG. 10 could be used with any other suitable electronic device and in any suitable system.

As shown in FIG. 10, an electronic device obtains multiple calibration parameters associated with multiple sensors of a selected mobile device at step 1002. This could include, for example, the electronic device 101 obtaining the calibration parameters 215-218, which are associated with the sensors 204 of the mobile device 202. The electronic device obtains an identification of multiple imaging tasks at step 1004. This could include, for example, the electronic device 101 obtaining a list of the imaging tasks 206. The electronic device obtains multiple synthetically-generated scene images at step 1006. This could include, for example, the electronic device 101 obtaining the scene images 208.

The electronic device generates multiple training images and corresponding meta information based on the calibration parameters, the imaging tasks, and the scene images at step 1008. This could include, for example, the electronic device 101 using the synthetic image fusion engine 220 to generate the sensor outputs 230 (which may include training images 705) and the ground truth scene meta information 240 (which may include the meta information 710). In some embodiments, the training images and corresponding meta information are generated concurrently, different ones of the training images correspond to different ones of the sensors, and different pieces of the meta information correspond to different ones of the imaging tasks. The electronic device provides the training images and the corresponding meta information to a CNN training engine configured to train multi-task CNNs at step 1010. This could include, for example, the electronic device 101 providing the sensor outputs 230 and the ground truth scene meta information 240 to the CNN training engine 250 for training the CNNs 260.

Although FIG. 10 illustrates one example of a method 1000 for generating training data using a synthetic image fusion engine, various changes may be made to FIG. 10. For example, while shown as a series of steps, various steps in FIG. 10 could overlap, occur in parallel, occur in a different order, or occur any number of times. Also, while described as being used to train CNNs, the same or similar approaches here may be used to train any other suitable machine learning architectures.

Although this disclosure has been described with reference to various example embodiments, various changes and modifications may be suggested to one skilled in the art. It is intended that this disclosure encompass such changes and modifications as fall within the scope of the appended claims.

What is claimed is:

1. A method comprising:
   obtaining, using at least one processor of an electronic device, multiple calibration parameters associated with multiple sensors of a selected mobile device, the calibration parameters comprising at least one noise histogram generated during a noise calibration of the mobile device and at least one color lookup table generated during a photometric calibration of the mobile device;
   obtaining, using the at least one processor, an identification of multiple imaging tasks;
   obtaining, using the at least one processor, multiple synthetically-generated scene images; and
   generating, using the at least one processor, multiple training images and corresponding meta information based on the calibration parameters, the identification of the imaging tasks, and the scene images;
   wherein the training images and the corresponding meta information are generated concurrently, different ones of the training images correspond to different ones of the sensors, and different pieces of the meta information correspond to different ones of the imaging tasks.

2. The method of claim 1, wherein different ones of the training images correspond to a sequence of consecutive image frames captured by the sensors over time.

3. The method of claim 1, further comprising:
   training one or more multi-task convolutional neural networks (CNNs) using the training images and the corresponding meta information.

4. The method of claim 1, wherein the calibration parameters comprise intrinsic and extrinsic parameters of each sensor, lens model parameters, noise model parameters, and color mapping parameters.

5. The method of claim 4, wherein:
   the lens model parameters comprise multiple lens distortion coefficients of a lens distortion map generated during a geometric calibration of the mobile device;
   the noise model parameters comprise the at least one noise histogram generated during the noise calibration of the mobile device; and
   the color mapping parameters comprise the at least one color lookup table generated during the photometric calibration of the mobile device.

6. The method of claim 1, wherein the training images emulate different levels of sensor noise and lens distortion reflecting different types and locations of the sensors.

7. The method of claim 1, wherein the imaging tasks comprise at least two of: depth mapping, optical flow mapping, semantic segmentation, scene recognition, object detection, high dynamic range (HDR) generation, Bokeh generation, and super-resolution.

8. The method of claim 1, wherein at least some of the meta information comprises ground truth scene meta information that exhibits pixel-level accuracy.

9. The method of claim 1, wherein the scene images are selected from a public scene image dataset.

10. An electronic device comprising:
    at least one memory configured to store instructions; and
    at least one processor configured when executing the instructions to:
       obtain multiple calibration parameters associated with multiple sensors of a selected mobile device, the calibration parameters comprising at least one noise histogram generated during a noise calibration of the mobile device and at least one color lookup table generated during a photometric calibration of the mobile device;
       obtain an identification of multiple imaging tasks;
       obtain multiple synthetically-generated scene images; and
       generate multiple training images and corresponding meta information based on the calibration parameters, the identification of the imaging tasks, and the scene images;
    wherein the training images and the corresponding meta information are generated concurrently, different ones of the training images correspond to different ones of the sensors, and different pieces of the meta information correspond to different ones of the imaging tasks.

11. The electronic device of claim 10, wherein different ones of the training images correspond to a sequence of consecutive image frames captured by the sensors over time.

12. The electronic device of claim 10, wherein the at least one processor is further configured to train one or more multi-task convolutional neural networks (CNNs) using the training images and the corresponding meta information.

13. The electronic device of claim 10, wherein the calibration parameters comprise intrinsic and extrinsic parameters of each sensor, lens model parameters, noise model parameters, and color mapping parameters.

14. The electronic device of claim 13, wherein:
    the lens model parameters comprise multiple lens distortion coefficients of a lens distortion map generated during a geometric calibration of the mobile device;
    the noise model parameters comprise the at least one noise histogram generated during the noise calibration of the mobile device; and
    the color mapping parameters comprise the at least one color lookup table generated during the photometric calibration of the mobile device.

15. The electronic device of claim 10, wherein the training images emulate different levels of sensor noise and lens distortion reflecting different types and locations of the sensors.

16. A non-transitory machine-readable medium containing instructions that when executed cause at least one processor of an electronic device to:
    obtain multiple calibration parameters associated with multiple sensors of a selected mobile device, the calibration parameters comprising at least one noise histogram generated during a noise calibration of the mobile device and at least one color lookup table generated during a photometric calibration of the mobile device;

obtain an identification of multiple imaging tasks;

obtain multiple synthetically-generated scene images; and generate multiple training images and corresponding meta information based on the calibration parameters, the identification of the imaging tasks, and the scene images;

wherein the training images and the corresponding meta information are generated concurrently, different ones of the training images correspond to different ones of the sensors, and different pieces of the meta information correspond to different ones of the imaging tasks.

17. The non-transitory machine-readable medium of claim 16, wherein different ones of the training images correspond to a sequence of consecutive image frames captured by the sensors over time.

18. The non-transitory machine-readable medium of claim 16, wherein the instructions when executed further cause the at least one processor to train one or more multi-task convolutional neural networks (CNNs) using the training images and the corresponding meta information.

19. The non-transitory machine-readable medium of claim 16, wherein the calibration parameters comprise intrinsic and extrinsic parameters of each sensor, lens model parameters, noise model parameters, and color mapping parameters.

20. The non-transitory machine-readable medium of claim 19, wherein:

the lens model parameters comprise multiple lens distortion coefficients of a lens distortion map generated during a geometric calibration of the mobile device;

the noise model parameters comprise the at least one noise histogram generated during the noise calibration of the mobile device; and the color mapping parameters comprise the at least one color lookup table generated during the photometric calibration of the mobile device.

* * * * *